(12) United States Patent
O'Neill et al.

(10) Patent No.: US 11,438,554 B2
(45) Date of Patent: Sep. 6, 2022

(54) SYSTEM AND METHOD FOR REMOTE DETECTION AND LOCATION OF GAS LEAKS

(71) Applicant: Mission Support and Test Services, LLC, Las Vegas, NV (US)

(72) Inventors: Mary D. O'Neill, Santa Barbara, CA (US); Mark Morey, Las Vegas, CA (US); David Terry, Santa Barbara, CA (US)

(73) Assignee: Mission Support and Test Services, LLC, North Las Vegas, NV (US)

( * ) Notice: Subject to any disclaimer, the term of this patent is extended or adjusted under 35 U.S.C. 154(b) by 0 days.

(21) Appl. No.: 16/989,732

(22) Filed: Aug. 10, 2020

(65) Prior Publication Data

US 2021/0076006 A1 Mar. 11, 2021

Related U.S. Application Data

(60) Provisional application No. 62/885,144, filed on Aug. 9, 2019.

(51) Int. Cl.
*H04N 7/18* (2006.01)
*G08B 21/12* (2006.01)
(Continued)

(52) U.S. Cl.
CPC .............. *H04N 7/183* (2013.01); *G01M 3/04* (2013.01); *G06K 9/6218* (2013.01); *G06T 7/246* (2017.01);
(Continued)

(58) Field of Classification Search
None
See application file for complete search history.

(56) References Cited

U.S. PATENT DOCUMENTS 2,562,181 A 7/1951 Frommer
2,737,591 A 3/1956 Wright et al.
(Continued)

OTHER PUBLICATIONS

Liu Z, Lu G, Liu X, Jiang X, Lodewijks G. Image processing algorithms for crack detection in welded structures via pulsed eddy current thermal imaging. IEEE Instrumentation & Measurement Magazine. Aug. 10, 2017;20(4):34-44. (Year: 2017).*
(Continued)

*Primary Examiner* — Clifford Hilaire
(74) *Attorney, Agent, or Firm* — Weide & Miller, Ltd.

(57) ABSTRACT

A system for monitoring for a gas leak from a gas containing structure is disclosed. The system includes a lens that directs an image of a scene of interest through an optical filter onto a detector. The filter is associated with the lens and the filter has one or more passbands that passes wavelengths which match one or more emission or reflectively wavelengths of the gas being monitored. A detector receives the image after the image passes through the lens and the filter. The detector generates image data representing the scene including the gas containing structure. A processor is configured to process the image data by executing machine executable code stored on a memory. The machine executable code processes the image data to identify turbulence flows in the image data such that turbulence flow indicates a gas leak, and generate and send an alert in response to the identification of a turbulence flow.

13 Claims, 11 Drawing Sheets

(51) Int. Cl.

| | |
|---|---|
| G06K 9/62 | (2022.01) |
| H04N 5/272 | (2006.01) |
| H04N 5/225 | (2006.01) |
| G01M 3/04 | (2006.01) |
| G06T 7/246 | (2017.01) |
| G06V 10/147 | (2022.01) |
| G06V 20/52 | (2022.01) |

(52) U.S. Cl.
CPC ............ *G06V 10/147* (2022.01); *G06V 20/52* (2022.01); *G08B 21/12* (2013.01); *H04N 5/2256* (2013.01); *H04N 5/272* (2013.01); *G06T 2207/30232* (2013.01)

(56) References Cited

U.S. PATENT DOCUMENTS

| | | | | |
|---|---|---|---|---|
| 4,598,247 | A | 7/1986 | Mako | |
| 5,200,149 | A | 4/1993 | Firsher | |
| 5,303,024 | A | 4/1994 | Thierman | |
| 6,025,788 | A * | 2/2000 | Diduck | G01M 3/18 340/3.4 |
| 7,358,860 | B2 * | 4/2008 | Germouni | G01J 5/522 340/603 |
| 7,375,814 | B2 * | 5/2008 | Reichardt | G01M 3/20 250/330 |
| 7,685,873 | B2 | 3/2010 | Shapira | |
| 10,466,174 | B2 | 11/2019 | Glacer | |
| 2008/0048121 | A1 * | 2/2008 | Hinnrichs | G01J 5/10 250/340 |
| 2008/0213442 | A1 | 9/2008 | Hughes | |
| 2011/0013016 | A1 | 1/2011 | Tillotson | |
| 2014/0125860 | A1 | 5/2014 | Tofsted | |
| 2015/0254813 | A1 | 9/2015 | Foi | |
| 2016/0005154 | A1 | 1/2016 | Meyers | |
| 2017/0006227 | A1 * | 1/2017 | O'Neill | G01W 1/00 |
| 2019/0346337 | A1 * | 11/2019 | Grimberg | G01M 3/002 |

OTHER PUBLICATIONS

Terry DD, O'Neill MD. Passive method to characterize atmospheric turbulence. Nevada Test Site/National Security Technologies, LLC (United States); Sep. 9, 2014. (Year: 2014).*

O'Neill M. Strength of turbulence from video imagery. Nevada National Security Site/Mission Support and Test Services LLC; Las Vegas, NV (United States); Jan. 1, 2017. (Year: 2017).*

Sydney Goldstein, "Fluid Mechanics in the First Half of this Centruy", Harvard University, Cambridge, Massachusetts, Annu. Rev. Fluid Mech. 1969.1:1-29, downloaded from www.annualreviews. org, 29 pages, date unknown.

David L. Fried, "Probability of getting a lucky short-exposure emage through turbulence*", The Optical Sciences Company, (c) Optical Society of America, vol. 68, No. 12, Dec. 12, 1978.

A. N. Kolmogorov, "The Local Structure of Turbulence in Incompressible Viscous Fluid for Very Large Reynolds Numbers", Proceeding: Mathematical and Physical Sciences, vol. 434 No. 1890, Turbulence and Stochastic Process: Komogorov's Ideas 50 Years on (Jul. 8, 1991), pp. 9-13, http://www.jstor.org/stable/51980, Royal Society Publishing, 6 pages.

Jacques M. Beckers, "Adaptive Optics for Astronomy: Principles, Performance, and Applications", Annual Reviews, www.annualreviews. org/aronline, Annu. Rev. Aston. Astrophys. 1993, 31: 13-62, Copyright © 1993 by Annual Reviews inc., date unknown, 53 pages.

M. S. Belen'kii, et al., "Experimental validation of the differential image motion lidar concept", Optic Letters, vol. 25, No. 8, © 2000 Optical Society of America, Apr. 15, 2000, 3 pages.

David H. Tofsted, Army Research Laboratory, ARL, "Turbulence Simulation: Outer Scale Effects on the Refractive Index Spectrum" Computational and Informational Sciences Directorate Battlefield Environment Division, ARL-TR-548, Nov. 2000, 50 pages.

Mikhail S. Belen'kii, et al., "Turbulence-induced edge image waviness: theory and experiment", © 2001 Optical Society of America, Applied Optics vol. 40, No. 9, Mar. 20, 2001, 8 pages.

S. Zamek, et al., "Turbulence strength estimation from an abritratry set of atmospherically degraded images", Department of Electo-Optics Engineering, Ben Gurion University, © 2006 Optical Society of America, vol. 23, No. 12, Dec. 2006, 8 pages.

Patrice Martinez, et al., "On the Difference between Seeing and Image Quality: When the Turbulence Outer Scale Enters the Game", Telescopes and Instrumentation, The Messenger 141, Sep. 2010, 4 pages.

David H. Tofsted, "Reanalysis of turbulence effects on short-exposure passive imaging", Optical Engineering, vol. 50(1), 016001, Jan. 2011, 9 pages.

Terry, et al. "(U) Real-Time Atmospheric Mitigation Sensor System ($RAMS^2$)", Fifth Gait Technologies, Inc., Santa Barbara, CA, Mar. 2012, 10 pages.

Ingmar G.E. Renhorn, et al., "Experimental observation of spatial correlation of scintillations from an extended incoherent source", Optical Engineering, SPIE DigitalLibrary.org/oe, vol. 52(2), 026001, Feb. 2013, 7 pages.

David H. Tofsted, "Extended high-angular-frequency analysis of turbulence effects on short-exposure imaging", Optical Engineering, SPIE Digital Library.org/oe, vol. 53(4), Apr. 2014, 11 pages.

"Measurements of the Refractive Index Structure Constant and Studies on Beam wander", Keiichi Yano, et al., Proc. International Conference on Space Optical Systems and Applications (ICSOS) 2014, P15, Kobe, Japan, May 7-9, 2014, 4 pages.

P. A. Konyaev, et al., "Passive Optical Methods in Measurement of the Structure Parameter of the Air Refractive Index—Inverse Problems of Atmospheric and Ocean Optics", ISSN 1024-8560, Atmospheric and Oceanic Optics, 2015, vol. 28, No. 6, (c) Pleiades Publishing, Ltd., 2015, Apr. 15, 2015, 2 pages.

Scintillometer, Wikipedia, https://en.wikipedia.org/wiki/Scintillometer, May 24, 2016, 2 pages.

"Refractive Index", Wikipedia, https://en.wikipedia.org/wiki/Refractive_index, May 24, 2016, 17 pages.

M.G. Sterenborg, et al., "Determining the refractive index structure constant using high-resolution radiosonde data", paper, 40 pages, date unknown.

Richard L. Espinola, et al., "Turbulence degradation and mitigation performance for handheld weapon ID", Infrared Imaging Systems: Design, Analysis, Modeling, and Testing XXIII. edited by Gerald C. Holst, Keith A. Krapels, Proc. Of SPIE vol. 8355, 53550S (c) 2012 SPIE, date unknown, 12 pages.

Born, M., E. Wolf, Principles of Optics, Section 9.2, Pergamon, New York, 1965.

Carrano, C., "Bispectral speckle imaging algorithm performance of specific simulated scenarios," LLNLTR645877, Lawrence Livermore National Laboratory, Livermore, California, Nov. 2013.

Fried, D. L., "Optical heterodyne detection of an atmospherically distorted signal wavefront," Proc. IEEE 55 (1967) 57-77.

Hufnagel, R. E., "The probability of a lucky exposure," Tech. Memo. REH0155, Perkin-Elmer, Norwalk, Connecticut, Feb. 1989.

Lukin, V. P., N. N. Botygina, O.N. Emaleev, P.A. Konyaev, "Wavefront sensors for adaptive optical systems," Meas. Sci. Rev. 10, 3(2010) 102-107.

Max, C., Lecture 3 of Astronomy 289C: Adaptive Optics and its Applications, University of California, Santa Cruz, Apr. 8, 2010.

Noll, R. J., "Zernike polynomials and atmospheric turbulence," J. Opt. Soc. Am. 66 (1976) 207-211.

O'Neill, M. D., D. Terry, A. Potter, I. McKenna, "Passive method to characterize atmospheric turbulence," in Site-Directed Research and Development, FY 2013, National Security Technologies, LLC, Las Vegas, Nevada, 2014, 125-135.

Rais, M., J.-M. Morel, C. Thiebaut, J.-M. Delvit, G. Facciolo, "Improving the accuracy of a Shack-Hartmann wavefront sensor on extended scenes," 6th International Workshop on New Computational Methods for Inverse Problems (NCMIP), May 2016, Cachan, France, https://hal-enpc.archivesouvertes. fr/hal-01344949/ document, accessed Oct. 5, 2016.

Sidick E., J. J. Green, C. M. Ohara, D. C. Redding, "An adaptive cross-correlation algorithm for extended scene Shack-Hartmann

(56) References Cited

OTHER PUBLICATIONS wavefront sensing," in Adaptive Optics: Analysis and Methods/Computational Optical Sensing and Imaging/Information Photonics/Signal Recovery and Synthesis Topical Meetings on CD-ROM, OSA Technical Digest (CD) (Optical Society of America, 2007), paper JTuA7, http://www.meripet.com/Papers/JTuA7.pdf, accessed Oct. 5, 2016.

Sidick, E., "Extended scene Shack-Hartmann wavefront sensor algorithm: Minimization of scene content dependent shift estimation errors," Appl. Opt. 52 (2013) 6487-6496.

Tofsted, D., "Passive adaptive imaging through turbulence," Proc. SPIE 9833 (2016) 98330B.

O'Neill, M. D., D. Terry, "Portable COTS RGB wavefront sensor," MSS Passive Sensors, Gaithersburg, Maryland, 2016.

O'Neill, M. D., D. Terry, "RGB wavefront sensor for turbulence mitigation," in Site-Directed Research and Development, FY 2016, National Security Technologies, LLC, Las Vegas, Nevada, 2017, 09-117.

Poyneer, L. A., K. La Fortune, C. Chan, "Scene-based wave-front sensing for remote imaging," UCRL-JC-154654 Lawrence Livermore National Laboratory, Livermore, California, 2003.

Vdovin, G., O. Soloviev, M. Loktev, V. Patlan, "OKO Guide to Adaptive Optics," 4th edition, OKO Technologies, May 2013.

Hufnager, R.E., Measurement of Atmospheric Turbulence via Observations of Instantaneous Optical Blur Functions, Perkin-Elmer Corporation, Norwalk, Connecticut, USA, 1970, 11 pages.

Sam McDonald, "New Tool for Measuring Carbon Dioxide in the Atmosphere Shows Promise", NASA Langley Research Center, NASA TV, National Aeronautics and Space Administration, https://www.nasa.gov/larc/new-tool-for-measuring-carbon-dioxide-in-the-atmosphere-shows-promise. Aug. 6, 2017, 4 pages.

"What is a blackbody source and what is it used for? (FAQ—Thermal)" FAQs, National Physical Laboratory, http://www.npl.co.uk/reference/faqs/what-is-a-blackbody-source-and-what-is-it-used_-for-(faq-thermal), Oct. 8, 2007 (updated Mar. 25, 2010), unknown 1 page.

\* cited by examiner

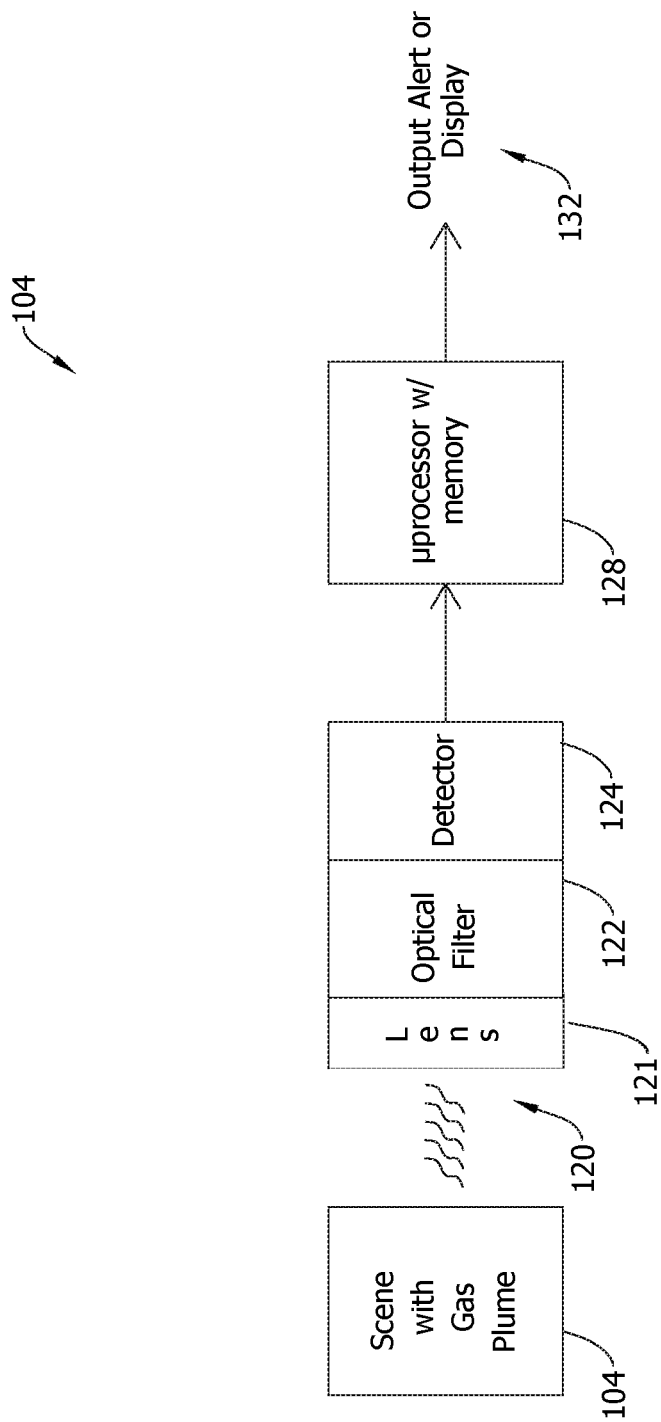

SYSTEM AND METHOD FOR REMOTE DETECTION AND LOCATION OF GAS LEAKS

1. STATEMENT REGARDING FEDERAL RIGHTS

This invention was made with government support under Contract No. DE-AC52-06NA25946 and was awarded by the U.S. Department of Energy, National Nuclear Security Administration. The government has certain rights in the invention.

2. FIELD OF THE INVENTION

The invention relates to environment monitoring systems and in particular to a method and apparatus for monitoring of gas leaks.

3. RELATED ART

There is a need for reliable preventative maintenance solutions for gas leak detection. Detection of gas leaks is important not only for the safety of workers and loss of revenue but also for climate change mitigation. Existing gas leak detection methods are not selective in source location meaning that the detection method detects the gas, but not the source of the leak. Examples of prior art gas detection methods include catalytic combustible, electrochemical, photo ionization, flame ionization, infrared (IR) or ultraviolet (UV) absorption, metal oxide, thermal conductivity, colorimetric and light scattering. However, these systems all suffer from one or more drawbacks.

Current advances in infrared (IR) sensing technology make visualization of gas leaks possible, but the sensitivity and selectivity of these methods varies significantly with background temperatures and humidity thus causing such system to be unreliable over differing environments. Moreover, these types of systems are very expensive, thus making this option prohibitively expensive. Hyperspectral imaging systems can detect the gasses by looking at the full spectra but sacrifice spatial resolution. In addition, these systems are complex and cost hundreds of thousands of dollars, which is too costly for most applications. Optical Gas Imaging (OGI) systems are single band systems, such as the FLIR Gas Finder series and OpGal EyeCGas series. These systems are cryogenically cooled, expensive to maintain, and are limited by contrast with the background scene. A FLIR uncooled version using a microbolometer has been developed, but such systems have a starting cost of tens of thousands of dollars for a basic system. Prior art systems, which provide a rough graphic visualization of the gas leak, require a human to be able to see the gas in the imagery. The need for human monitoring or analysis increases costs and limits the reasonable ability for 24-hour monitoring.

Gas enhancement techniques have been developed and are in the prior art, but existing techniques are not sufficient to increase the contrast to allow visualization to be limited only by the sensor signal to noise ratio (SNR). The OpGal EyeCGas FX system, available from OPGAL.com, is an automatic gas leak detection and alert system, but the image processing techniques still leave much of the background scene with higher SNRs ratio making such systems unusable or only able to detect massive gas leaks in certain environments/temperatures. Therefore, a need exists in the art for an improved, cost effective, and accurate method and apparatus for automatic detection and location of gas leaks, including near and remote location sensing.

SUMMARY

To overcome the drawbacks of the prior art and provide additional benefits, a system for monitoring for a gas leak from a gas containing structure is disclosed. In one embodiment this system comprises a lens configured to receive an image of a scene of interest such that the scene of interest contains a gas containing structure containing a gas being monitored. Also part of this embodiment is a filter located after the lens, the filter having one or more passbands that pass wavelengths which match one or more emission or reflectively wavelengths of the gas being monitored. A detector is arranged to receive the image after the image passes through the lens and the filter and the detector is configured to generate image data representing the scene including gas containing structure. A processor is configured to process the image data by executing machine executable code. A memory is configured to store non-transitory machine executable code. The machine executable code is configured to process the image data to identify turbulence flow in the scene represented by the image data such that turbulence flow indicates a gas leak and generate and send an alert in response to the identification of a turbulence flow.

In one embodiment, the gas containing structure is selected from the following group of gas containing structures: pipe, pipeline, tank, barrel, hose, tanker, container, or any structure that contains a gas needing to be monitored. The step of processing the image data may comprise superimposing the identified turbulence flow on a context image to create an alert image and sending the alert image with the alert. The processing of the image data may comprise calculating the flux variance of a frame stack to enhance turbulence to create variance image. In one configuration, this system further comprises using a clustering algorithm to cluster pixels represented by the image data that are above a signal to noise threshold and analyze cluster objects for flow patterns indicating gas flow. It is also contemplated that the system may further comprise, for variance images, computing a derivate image to obtain spatial derivative of a flux variance for column and rows of pixel blocks, computing an angle of gas flow for pixels, computing the magnitude of gas flow for pixels, and removing false object movement based on average flow direction. This system may further comprise a communication module configured with a wired or wireless transceiver such that the communication module is configured to send the alert to provide notification of the gas leak.

Also disclosed is a method for monitoring for a gas leak from a gas containment structure containing a gas comprising providing a gas leak monitoring system that includes a lens, filter, and detector, which form a sensor, and also a processor, and a memory. Directing the sensor at a scene to receive emitted or reflected image wavelengths from the scene. The scene comprises at least a portion of the gas containment structure and an area around the gas containment structure. Then, filtering the scene with the filter located in the sensor such that the filter has a passband that corresponds to an emission band or reflection band of the gas. This method also includes capturing image data with the sensor. The image data represents the scene after filtering by the filter. The image data is processed to identify turbulence based on variation in pixel values over time and, responsive to identification of turbulence, generate and send an alert indicating a gas leak.

In one embodiment, this method further comprises providing a lens and adjusting the lens to control the portion of the gas containment structure and the area around the gas containment structure that is presented to the filter and detector. The processing of the image data may further comprise calculating the variance of a frame stack to enhance turbulence to create variance image. In one variation, this method may further comprise, using a clustering algorithm to cluster pixels represented by the image data that are above a signal to noise threshold and analyze cluster objects for flow patterns indicating turbulence. This method may further comprise, for variance images, computing a derivate image to obtain derivative of an intensity for column and rows of pixel blocks, computing an angle of gas flow for pixels, computing the magnitude of gas flow for pixels, and removing false object movement based on average flow direction. In one arrangement, the processing the image data further comprises removing or disregarding object movement unrelated to gas leaks from the image based on average flow direction of pixel data. It is contemplated that this method of operation may send an alert comprises sending an alert with an image of the gas leak overlaid on a context image.

A further embodiment is disclosed that is a system for monitoring and detecting a release of a gas from a monitored area. This system includes a lens and filter, directed at the monitored area that generates a filtered image. The filter has a passband that passes at least one emission wavelength or reflective wavelength of the gas. Also part of this embodiment is a detector configured to receive and generate image data representing the filtered image. A communication module is configured to communicate over a network and a processor is configured to execute machine executable instructions. A memory is configured to store machine executable instructions that process the image data to identify and isolate turbulence generated by a release of the gas based on changes in pixel values over time. The machine executable instructions also generate an alert configured to notify a person of the gas leak and send the alert to the person.

In one embodiment, the lens is configured to optimally focus the gas leaks in the scene image onto the detector. This system may further comprise an energy source configured to illuminate an area being monitored for release of a gas. The alert may include an image that shows the gas leak and the monitored area and/or the type of gas which is leaking.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 1B illustrates a block diagram of an example embodiment of a gas leak detection system for sensing emissive gas.

DETAILED DESCRIPTION

The innovation disclosed herein allows unmanned remote detection and location of leaks under low contrast conditions within two seconds or less. In various embodiments, the detection may occur within 1 minute or less, 30 seconds or less, 15 seconds or less, 10 seconds or less, or 2 seconds or less depending on processing power of the system hardware, the size/resolution of the monitored scene and the gas concentration. This allows placement of the system at tens of meters from small leaks or hundreds of meters from the larger leaks with low cost micro-bolometers and optics in place of the larger cooled cameras. This innovation provides a very low-cost solution that could be attached to a cell phone for up close detection. This innovation may use both hardware and software optimization based on the chemistry and physics associated with gasses. Turbulence enhancement algorithms are used which increase the overall contrast of the gas with respect to the background. The turbulence enhancement algorithms increase the signal from the turbulent gas while almost completely eliminating the static background such as buildings and sky. The detected gas can then be overlaid onto a visible or IR image for full situational awareness for any company or individual who receives an alert monitoring a given gas to quickly locate the leak and judge the severity.

In one embodiment, the system consists of four generalized parts or steps:

1. Sensor and filter selection based on emission spectra of the target gas.
2. Turbulence enhancement and object creation.
3. Calculation of flow patterns, rejection of non-gas like flows.
4. Alarm and Display These steps are described in further detail in the following text and associated figures.

Figure 1A:
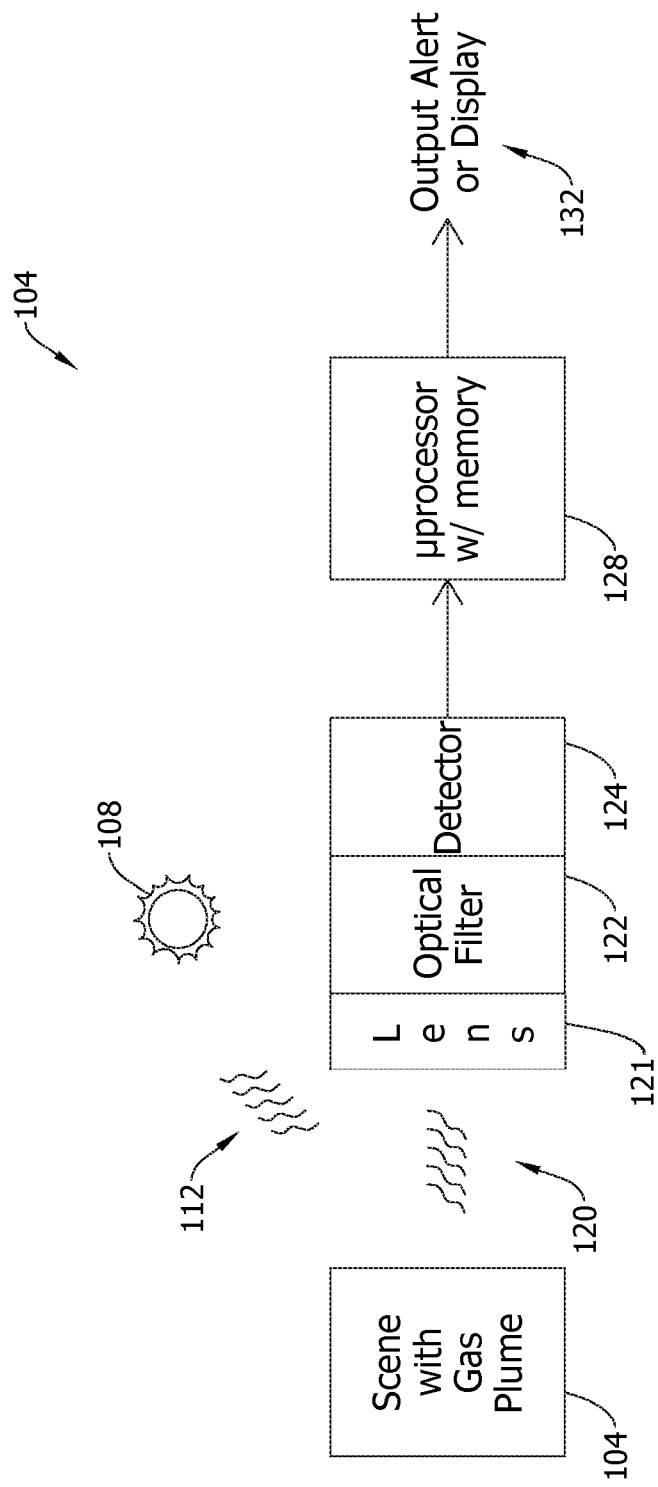
FIG. 1A illustrates a block diagram of an example embodiment of a gas leak detection system for sensing reflective gas.

FIG. 1A provides an exemplary diagram of a possible gas flow detector implementation. As shown in FIG. 1A, illumination 112 from the sun 108 or other source strikes a scene with gas plume 104. The other sources of illumination may be moon light, or man-made illumination such as from visible light sources, infrared light sources, ultraviolet, or any other energy source. The scene with gas plume 104 may be any environment or application, whether inside or outside, that gas may escape from an enclosed space, such as a tank, pipe, hose, or interconnect.

The reflection 120 of the illumination from the scene with gas plume 104 travels away from the scene toward a lens 121 and to an optical filter 122 that is mounted in front of a detector 124, such as a video camera or any image capture device. The optical filter 122 is an optical filter that is selected based on its band pass characteristics in relation the gas of interest. For example, it is desirable to have an optic filter that passes optic energy at a wavelength that corresponds to the reflection or emission wavelength of the type of gas being monitored. If monitoring for a particular gas that has a reflection or emission profile at 700 nm, then it is preferred that the passband of the optic filter 122 would correspond to the 700 nm reflection or emission range, such as a window around this wavelength. Optic filters are described in greater detail below. As discussed below, a lens (not shown in FIG. 1A) may also be configured before or after the filter 122. The lens 121, filter 122 and detector 124 may be collectively referred to as a sensor.

In one embodiment, the detector 124 is an image capture device such as a video camera capable of capturing successive images or a camera that captures images at a lower frame rate than a video camera. The detector generates image data defined by image detector pixels which, in one embodiment, are arranged in an array forming rows and columns of pixels. The resulting image data is arranged as a running stack of frames over time. The detector output may be sub-divided into smaller arrays or blocks of pixels.

Figure 4:
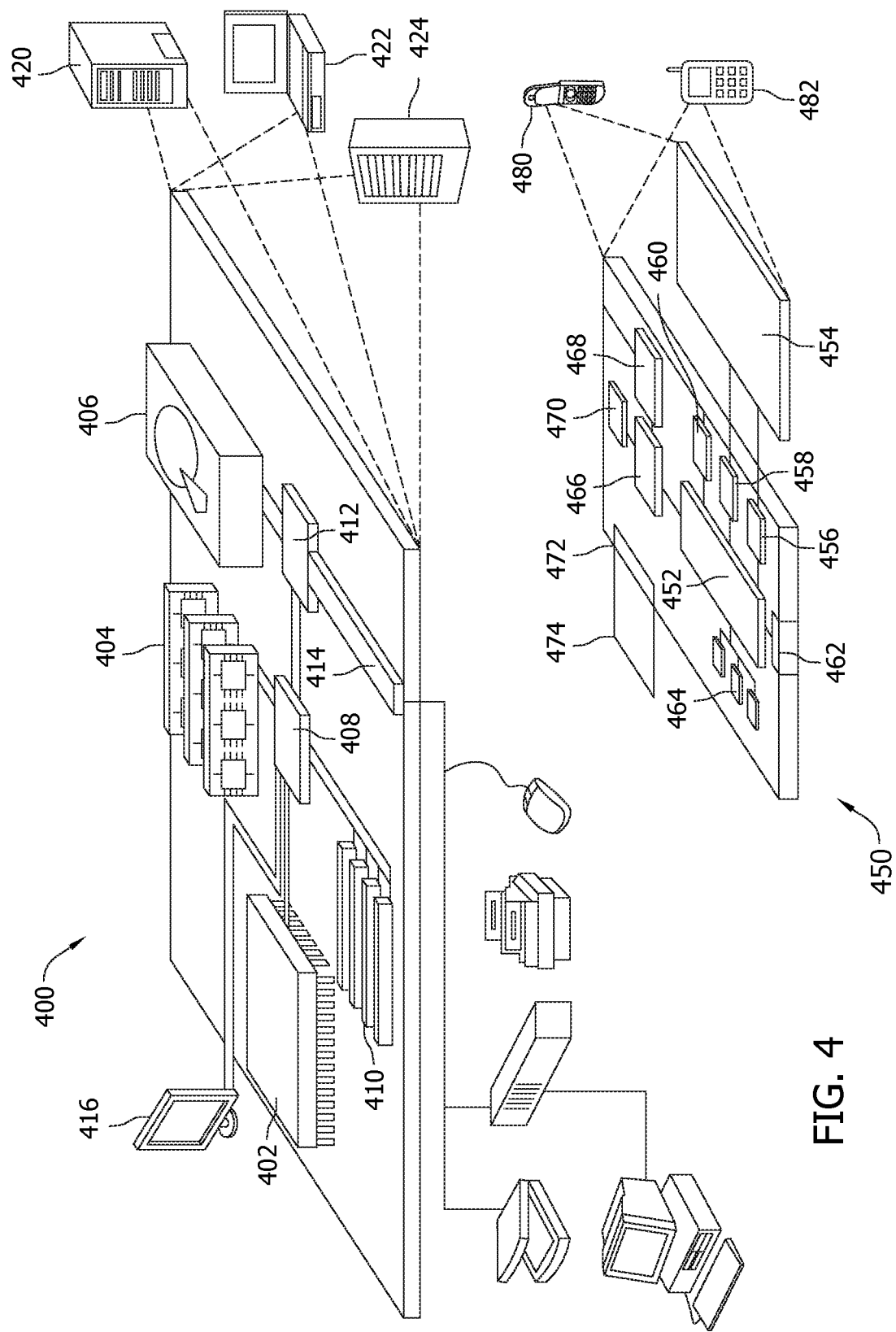
FIG. 4 is an exemplary computing system having a microprocessor.

The image data may be stored in the video detector (such as a camera) 124 or provided directly to a computing device 128, such as a processor (microprocessor or any data processing device) with memory. Any type detector 124 capable of capturing successive image data may be utilized including a detector array. The camera or video detector 124 may be separate from the computing device 128, or the computing device and camera may be combined. In one embodiment, the memory is configured to store in a non-transitory state, machine-readable code capable of being executed by the computing device 128 to process the image data as discussed in detail below. Algorithms, which are provided below, are in the form of equations utilized for processing the image data to isolate the gas flow in the air space 120 within the scene 104 that is captured in the image by the video detector 124. The output of computing device 128 provides data regarding the movement of the gas flow while removing the non-moving stationary object in the scene and other non-gaseous moving objects which behave differently than a gas flow. An exemplary computing device is shown in FIG. 4 and the associated text is provided below.

In operation, the light 112 travels from the illumination source 108 to the scene 104 to form a reflection 120 from the scene and gas plume (if a gas plume is present) to the detector 124 after passing through the lens 121 and filter 122. The computing device with memory 128 executes the process using the algorithms discussed below to isolate the gas flow while eliminating aspects of the scene which are not gas flow.

FIG. 1B provides an exemplary diagram of a possible gas flow detector implementation. As compared to FIG. 1A, identical elements are identified with identical reference numbers. In the embodiment of FIG. 1B, the illumination source 108 and resulting light or illumination energy 112 is removed. In this embodiment, a scene with gas plume 104 is present, such as due to a gas leak, and the gas that forms the gas leak is emissive, meaning that gas emits or radiates energy at certain wavelengths, typically in the infrared range as is the case for methane gas. Because the gas is emissive as compared to its background, an illumination energy source (natural or system generated) is not required and the system can operate without illumination. The scene with gas plume 104 may be any environment or application, whether inside or outside, that gas may escape from an enclosed space, such as a tank, pipe, hose, or interconnect.

The emission of energy from gas plume 104 travels away from the scene toward a lens 121 and optical filter 122 that is mounted in front of a detector 124, such as a microbolometer or any infrared image capture device. The optical filter 122 is an optical filter that is selected based on its band pass characteristics in relation the gas of interest. For example, it is desirable to have an optic filter 122 that passes optic energy at a wavelength that corresponds to or matches the emission wavelength of the type of gas being monitored. If monitoring for methane gas, it has an emission profile centered about 7.7 μm, and as such the passband of the optic filter 122 would correspond to or match that emission range with a bandpass optimized for contrast. Selection of optical filters are described in greater detail below.

In one embodiment the detector 124 is an image capture device, such as a video camera capable of capturing successive images or a camera, that captures images at a lower frame rate than a video camera. The detector generates image data defined by image detector pixels which are arranged in an array forming rows and columns of pixels. The resulting image data is arranged as a running stack of frames over time. The detector output may be sub-divided into smaller arrays or blocks of pixels.

The image data may be stored in the video detector (such as a camera) 124 or provided directly to a computing device 128, such as a processor (microprocessor) with memory. Any type detector 124 capable of capturing successive image data may be utilized. The camera or video detector 124 may be separate from the computing device 128 or the computing device and camera may be combined. In one embodiment, the memory is configured to store, in a non-transitory state, machine-readable code capable of being executed by the computing device 128 to process the image data as discussed herein in detail. The algorithms, which are discussed below, are in the form of equations utilized for processing the image data to isolate the gas flow in the air space 120 within the scene 104 that is captured in the image by the video detector 124. The output of the computing device 128 provides data regarding the movement of the gas flow emissions while removing the non-moving objects in the scene and also removing the moving objects which behave differently than a gas flow.

In operation, the wavelength specific emissions from the gas plume (if a gas plume is present) travel through the filter 122 to the detector 124. A processor with memory 128 executes the process using algorithms (discussed below) to isolate the gas flow while eliminating aspects of the scene which are not gas flow.

Figure 2:
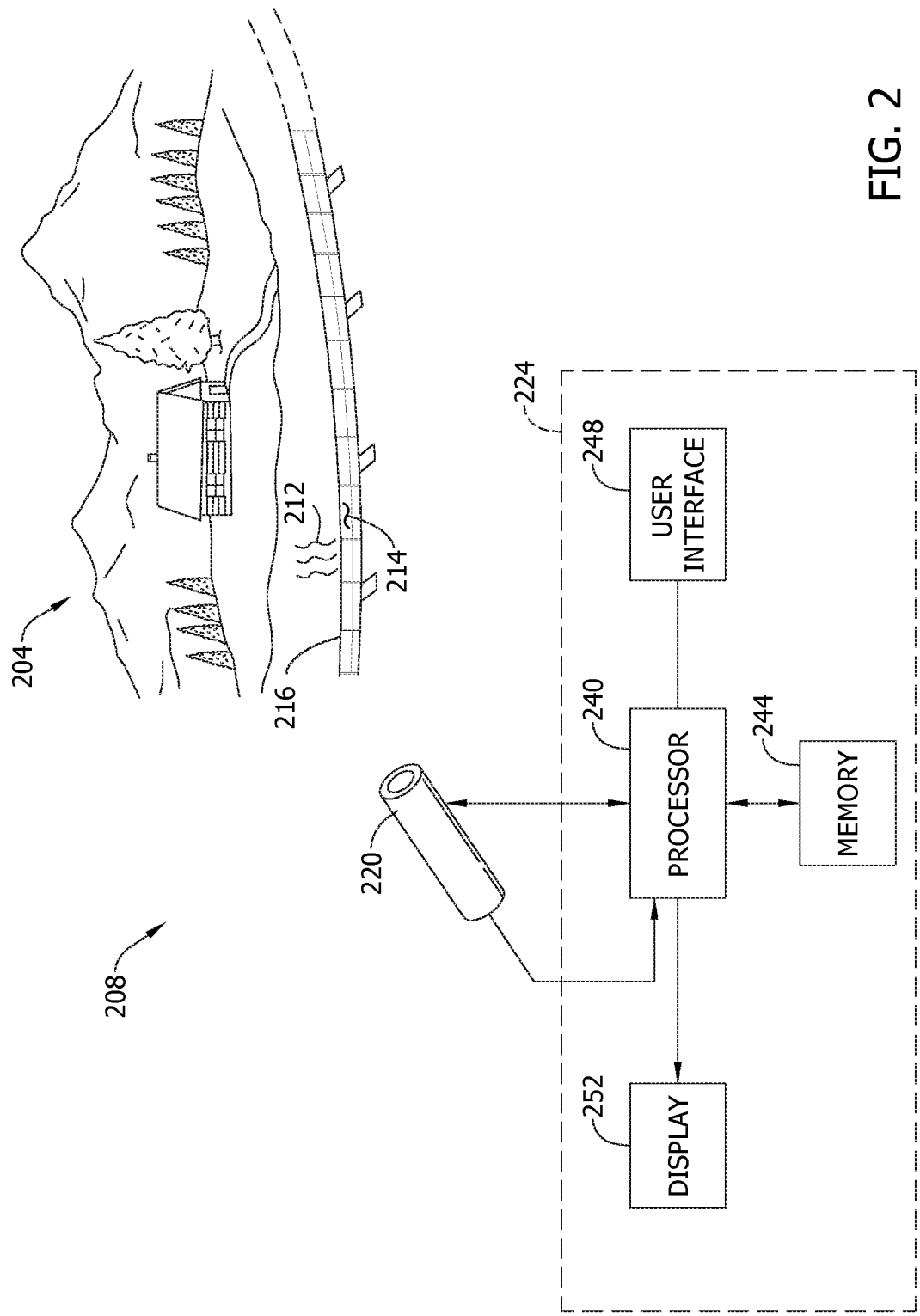
FIG. 2 illustrates an exemplary environment of use of the gas leak system.

FIG. 2 illustrates an example environment of use. This is but one possible example environment of use and system. It is contemplated that other embodiments and environments of use are possible. As shown, a distant scene 204 is presented for observation over a generally horizontal path. The reason for observation may vary by application but may range from the following applications: commercial monitoring, such as for pipelines, refineries, propane tanks, chlorine tanks and piping such as at swimming pools or fountains, any industrial use, environmental monitoring, transportation or storage (land or sea) of gas or liquid gas, fueling stations, trash to methane power plants, or any other use or environment needing or benefiting from monitoring for gas leaks.

In this example environment of use, the scene a natural environment which has a pipeline 216 running through the area. To protect the environment, people and animals in the environment, it is desirable to monitor for gas leaks 112 that may appear in the pipeline 216, such as due to cracks 214, improperly fitted joints, or any structural damage occurring for any reason.

Proposed and disclosed is a compact gas detection system 208 to monitor scenes 204 which are at risk of gas leaks. In this example embodiment, the detection system includes sensor elements 220 (discussed below in detail) and processing and display elements 224. The sensor elements 220 and processing and display elements 224 receive and process the image information to isolate the turbulent gas leak 212 at the wavelength of interest while removing the stationary background elements. The gas leak is turbulent as compared to the surrounding air. This provides a high contrast image of the gas leak that is clearer and more accurate than that achievable by prior art systems. The sensor elements 220 receive the image of the scene 204 and subject to the optical processing described herein, and further generates and presents digital image data representing scene to the processing and display elements 224. In this embodiment the sensor elements 220 includes a lens, an optic filter, and an image detector. These elements are described in greater detail in FIG. 3.

The processing and display elements 224 process the digital image data from the sensor elements 220. The processing and display elements 224 comprise a processor 240 that receives data from the sensor elements 220. The processor may include data input/output capability. The processor 240 communicates with a memory 244 configured to store data and machine executable instructions, which may be executed by the processor. A user interface 248 is provided to accept input from a user for control of one or more aspects of the imaging system 208 and to provide information to the user. A video or image display 252 is in communication with the processor to present the resulting image to a user. A transceiver may also be provided to communicate the results of the monitoring and detection to another system or to a person, such as in the form of an alert sent by email, text, or call. Additional components may be part of the processing and display elements 224. In one embodiment, the processing and display elements 224 may comprise a tablet, mobile communication device, laptop, computer, mobile smart phone device, heads up or headset display, vehicle computing elements and display, enclosed computing device or any other processing system.

Figure 3:
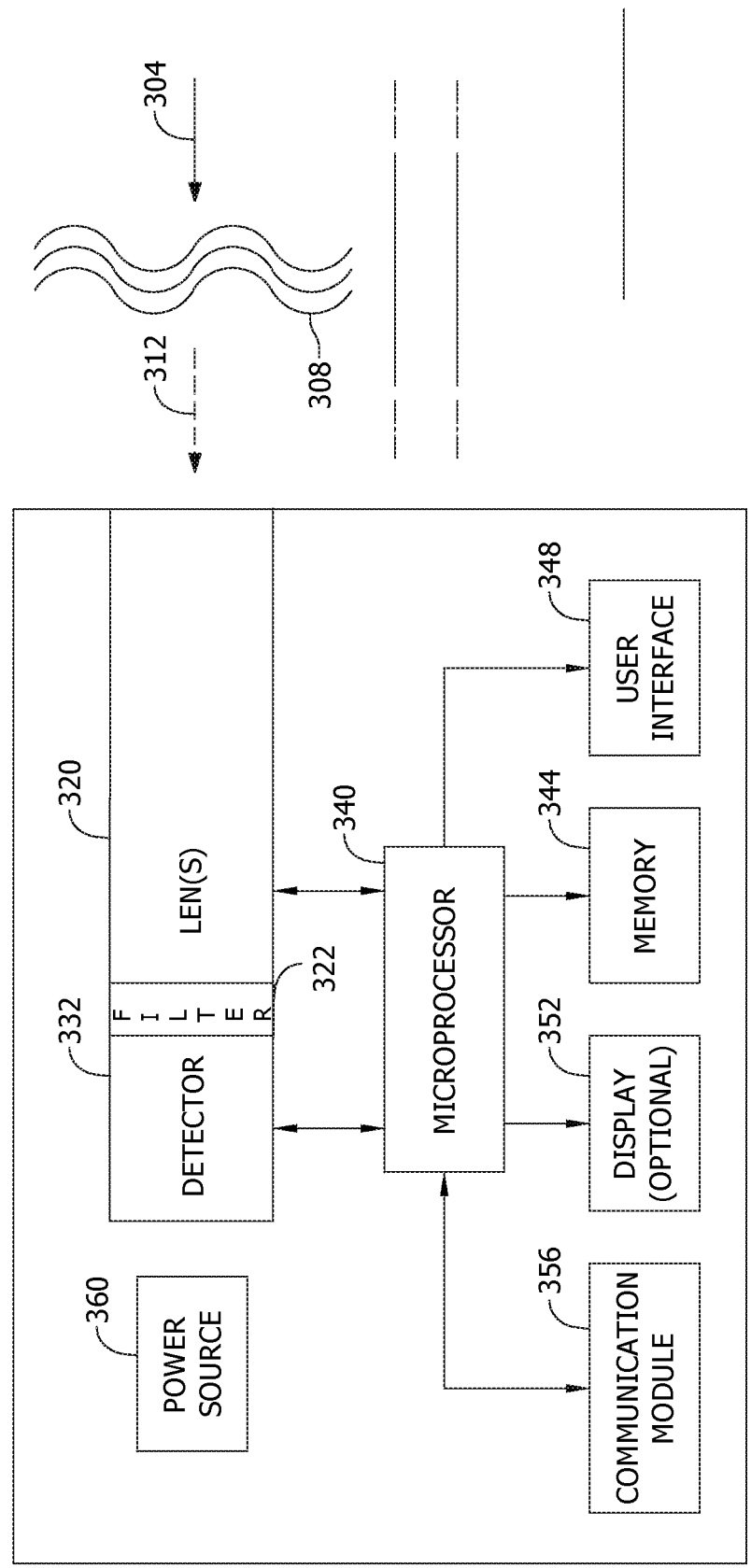
FIG. 3 illustrates a block diagram of an exemplary gas leak sensing and data processing system.

FIG. 3 is a block diagram of one example embodiment of the invention. This is but one possible embodiment and arrangement of elements. Other arrangements are contemplated and are not outside of the scope of the claims which follow. As discussed above in connection with FIGS. 1A and 1B, illumination 304 of the gas leak 308 or emissions from the gas leak in relation to the background creates the incoming scene image 312. The scene image 308 enters one or more lens elements 320 configured to direct and focus the image to an optic filter 322. The lens 320 may be any lens type having one or more elements and may include a wide-angle lens, standard lens, or telephoto lens depending on the scene being monitored. The magnification may be fixed or variable depending on the application to allow the user to establish the field of view that is ideal for the application.

Optic filters are discussed below in greater detail. The optic filter 322 filters the incoming light rays (which represent the scene with possible gas leak) thereby passing only wavelengths of light which correspond to the filter wavelength passband. Other wavelengths are blocked or attenuated. Different optic filters are configured with different passbands and such filter varieties may be obtained from optic filter manufactures and/or custom built if an off-the-shelf option is not available. In one embodiment, the optic filter 322 passband is selected to align with the reflecting wavelength band or emission wavelength band of the gas which is being monitored for leaks. In one embodiment, a further criteria for the optic filter 322 passband selection is avoidance of inclusion in the passband the background reflectivity wavelengths and background emissions wavelengths. For example, the gas being monitored may have two emission wavelengths. The background is assumed to be a graybody emitter. In such a situation, the optic filter passband would be selected at a wavelength band which maximizes the signal to background and signal to noise ratios allowing for the best contrast image. This isolates the passed optic signals to at the wavelength of the monitored gas.

Returning to FIG. 3, the light that passes through the lens 320 and optic filter 322 is presented to a detector element 332 that is configured to detect and record the passed signal. In one embodiment, the detector 332 is tuned to detect wavelengths that correspond to the passband of the optic filter.

The detector element 332 may be any type of detector element configured to capture an image such as an image detector for capturing and recording video or images. As with the filter, the detector element is chosen based on the spectral emissions or reflection of the gas to be detected. In one embodiment, the detector element is an infrared sensor available from manufacturers such as FLIR, Raytheon, Xenics, or Sensors Unlimited. In another embodiment, the detector element 332 outputs image data which may be characterized as frames of data such as may be created by a CCD image detector, CMOS detector, or any other type of detector capable of generating image data in response to the image 312 striking the detector after passing through the lens 320 and filter 322.

The output of the detector element 332 is presented to a microprocessor 340. The image data is presented to the processor and may be arranged in stacks of sequential image frames for subsequent processing as discussed below. In one embodiment, a commercially available mobile Samsung-based 8-CPU single-board computer (SBC) is utilized that drives the USB3 camera, runs Linux or any operating system. This device operates on battery power and offers WiFi connectivity. In other embodiments, any type microprocessor 340 or processor may be used. Numerous commercially available devices are capable of performing the computing described herein.

Also associated with the microprocessor is a memory 344 configured to store machine readable and executable code. The memory 344 may also store the image data from the detector or the image data may be processed in real time. Any type memory may be used including volatile and non-volatile memory. A user interface 348 is also part of this embodiment to provide input from the user to control, configure, or activate the system. Any type user interface 348 is contemplated. An optional electronic display 352 is provided to present the image to the user and to provide system information to the user. A power source 360, such as wire line power, solar or a battery is provided to power any of the devices requiring electrical energy. A communication module 356 may provide wireline, optical, or wireless communication to a remote location such as a server or access point. The communication module 356 may also communicate directly to a particular user to provide an alert to a person or entity when a gas leak is detected.

FIG. 4 is a schematic of a computing or mobile device, or server, such as one of the devices described above, according to one exemplary embodiment. FIG. 4 shows an example of a computing device 420 and a mobile computing device 480, which may be used with the techniques described here. Computing device 400 is intended to represent various forms of digital computers, such as laptops 422, desktops 420, workstations, personal digital assistants, servers 424, blade servers, mainframes, and other appropriate computers. Computing device 450 is intended to represent various forms of mobile devices, such as personal digital assistants, tablets, cellular telephones 480, smart phones 482, and other similar computing devices. The components shown here, their connections and relationships, and their functions, are meant to be exemplary only, and are not meant to limit the implementations described and/or claimed in this document.

Computing device 400 includes a processor 402, memory 404, a storage device 406 (HDD or SSD), a high-speed interface or controller 408 connecting to memory 404 and high-speed expansion ports 410, and a low-speed interface or controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a hard disk device, SSD, an optical disk device, or a tape device, a flash memory or other similar solid-state memory device, or an array of devices, including devices in a storage area network or other configurations. A computer program product can be tangibly embodied in an information carrier. The computer program product may also contain processor executable instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In one implementation, low-speed controller 412 is coupled to storage device 406 and low-speed bus 414. The low-speed bus 414, which may include various communication ports (e.g., USB, Bluetooth, Ethernet, wireless Ethernet) may be coupled to one or more input/output devices, such as a keyboard, a pointing device, a scanner, or a networking device, a switch, or router, such as through a network adapter.

The computing device 400 may be implemented in a number of different forms, as shown in the figure. For example, it may be implemented as a standard server 424, or multiple times in a group of such servers. It may also be implemented as part of a rack server system. In addition, it may be implemented in a personal computer such as a laptop computer 422. Alternatively, components from computing device 400 may be combined with other components in a mobile device, such as device 450. Each of such devices may contain one or more of computing device and an entire system may be made up of multiple computing devices communicating with each other.

Computing device 450 includes a processor 452, memory 464, an input/output device such as a display 454, a communication interface 466, and a transceiver 468, among other components. The device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor 452 may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or any other appropriate display technology including a touch screen. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, to enable near area communication of device 450 with other devices. External interface 462 may provide, for example for wired communication in some implementations or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472 which may include for example a SIMM (Single In Line Memory Module) card interface. Such expansion memory 474 may provide extra storage space for device 450 or may also store applications or other information for device 450. Specifically, expansion memory 474 may include instructions to carry out or supplement the processes described above and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains processor executable instructions that, when executed, perform one or more methods, such as those described above. The information carrier is a computer- or machine-readable medium, such as the memory 464, expansion memory 474, or memory on processor 452, that may be received such as over transceiver 468 or external interface 462.

Device 450 may communicate wirelessly through communication interface 466, which may include digital signal processing circuitry where necessary. The communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, Wifi, or other such transceiver (not shown). In addition, GPS (Global Positioning system) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, for instance, in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. Perhaps, it may be implemented as a cellular telephone 480. It may also be implemented as part of a smart phone 482, personal digital assistant, a computer tablet, or other similar mobile device.

Thus, various implementations of the systems and techniques described here can be realized in digital electronic circuitry, integrated circuitry, specially designed ASICs (Application Specific Integrated Circuits), computer hardware, firmware, software and/or combinations thereof. These various implementations can include implementation in one or more computer programs that are executable and/or interpretable on a programmable system including at least one programmable processor which may be special or general purpose, coupled to receive and transmit data and instructions, from and to, a storage system with at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a LCD (Liquid Crystal Display) monitor) for displaying information to the user and a keyboard and pointing device (e.g., a mouse or a trackball) by which the user can provide input to the computer. Other kinds of devices can be used to provide for interaction with a user as well; for example, feedback provided to the user can be any form of sensory feedback, such as visual feedback, auditory feedback, or tactile feedback and input from the user can be received in any form, including acoustic, speech, or tactile input.

The systems and techniques described here can be implemented in a computing system (e.g., computing device 400 and/or 450) that includes a back end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing systems of FIG. 4 can include clients and servers. A client and server are generally remote from each other and typically interact through a communication network. The relationship of client and server arises by virtue of computer programs running on the respective computers and having a client-server relationship to each other.

Figure 5:
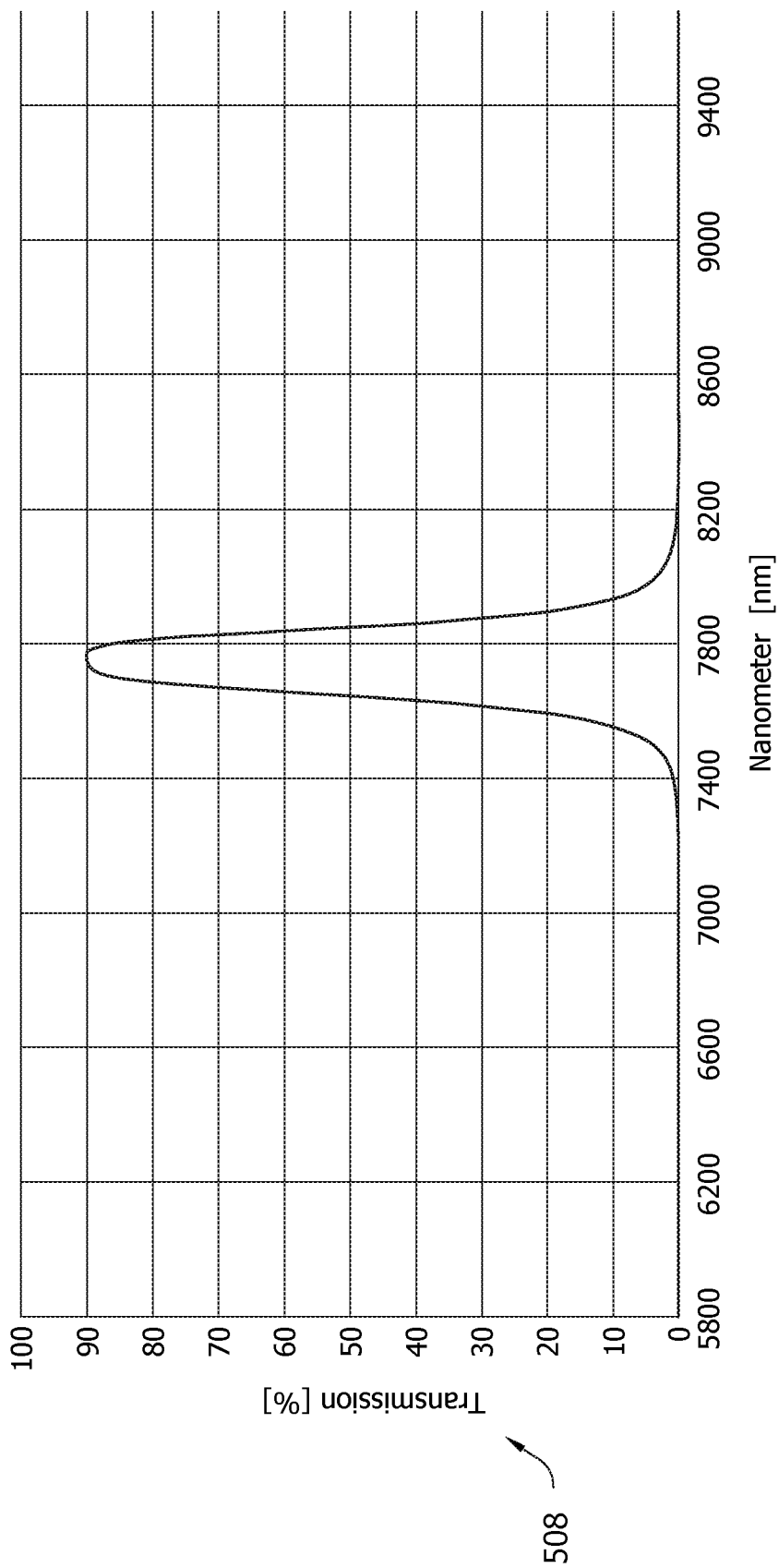
FIG. 5 illustrates a plot of a passband for an exemplary filter.

FIG. 5 illustrates a plot of an exemplary passband of an optic filter. This is one exemplary passband for one exemplary optic filter. As shown in FIG. 5, the horizontal axis 504 represents wavelength in nanometers and the vertical axis 508 represents transmission percentage. The plot 512 illustrates the passband of one exemplary optic filter. As shown, the optic filter passes wavelengths in the range of approximately 7600 nm to 7950 nm. The maximum transmission level of 90% is centered at approximately 7750 nm. In other embodiments, the passband may be at a different wavelength range and different transmission percentages. As discussed above, the passband of the optic filter is selected to correspond with one or more of the wavelength bands emitted or reflected by the monitored gas.

The following table provides an example of the peak wavelength of reflection or emission of some exemplary gases that may be used as a guide for filter passband selection. This list is exemplary only and is provided for purposes of discussion and not limitation. These gases or other gasses may have other reflectivity or emission bands at different or additional wavelengths. The system and method disclosed herein may work with numerous other gases than those listed below.

| Gas | Peak wavelength | Detector Type |
|---|---|---|
| NO$_2$ | 480 nm | Silicon - CMOS, CCD |
| NO$_2$ | 6.13 um | HgCdTe or InSb |
| Propane | ~3 um | HgCdTe or InSb |
| Propane | ~3 um | Modified Microbolometer |
| Propane (C$_3$H$_8$) | ~7 um | Modified Microbolometer |
| Propane | ~1.7 um | InGaas |
| SF$_6$ | 10.55 um | HgCdTe or InSb |
| SF$_6$ | 10.55 um | microbolometer |
| Methane (CH$_4$) | 7.7 um | HgCdTe or InSb |
| Methane (CH$_4$) | 7.7 um | microbolometer |
| CO | 4.6 um | HgCdTe or InSb |
| CO | 4.6 um | Modified Microbolometer |
| Gasoline | 1150-1250 nm | InGaas |
| Gasoline | 1150-1250 nm | NIR enhanced BSI CMOS |
| Gasoline | 3.4 um | Modified Microbolometer |
| Ethanol (gasoline) | 9.9 um | microbolometer |

Figure 6:
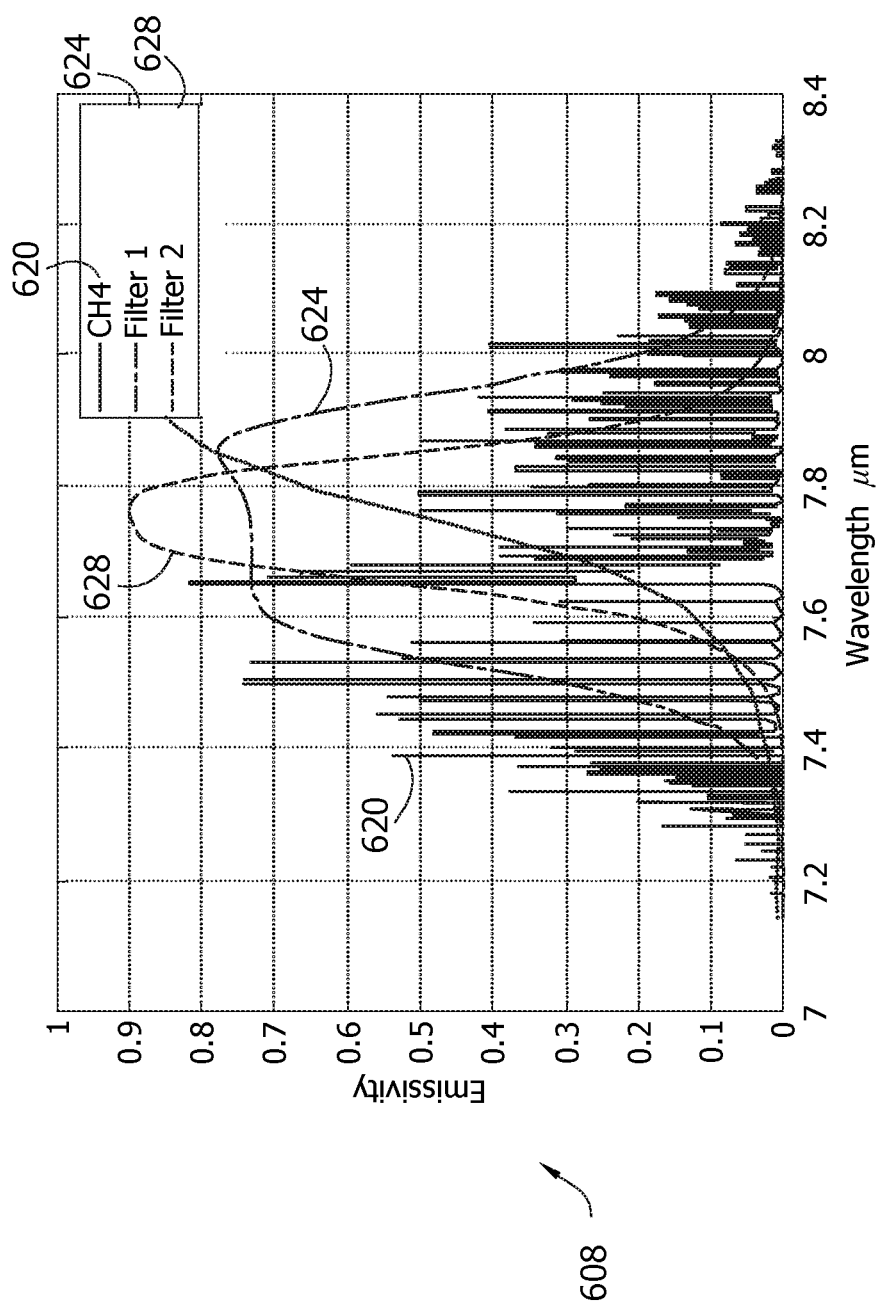
FIG. 6 illustrates a plot of wavelength versus emissivity for methane gas (CH4), and bandpass for two optic filters.

FIG. 6 illustrates a plot of transmission for two optic filters superimposed over a plot of the emissivity for methane (CH$_4$) versus wavelength. In this plot, the horizontal axis 604 represents wavelength and the vertical axis 608 represents transmission (for filters) and emissivity (for methane). The emissivity of methane 620 (entire plot) ranges from approximately 7.3 micrometers to 8.1 micrometers with numerous peaks as shown. If the monitored gas is methane 620, then wavelength range or band is from approximately 7.3 micrometers to 8.1 micrometers.

When selecting an optic filter, the passband of the filter may be selected to overlap with the emission band for methane 620. In the plot of FIG. 6, three exemplary optic filters passbands are shown. A first filter passband plot 624 having a passband of 480 nanometers centered at 7720 nanometers is shown. This first filter plot 624 covers a wide range of the methane emissions 620. A second filter plot 628 having a passband of 250 nanometers centered at 7730 nanometers is also shown. This second filter plot 628 has a higher pass percentage than the first filter plot 624 but a narrower passband. As can be understood from the plots of FIG. 6, different optic filters with different passbands may be selected to capture the emission range of the gas being monitored while blocking possible background emissions which are not from the monitored gas.

Detector and Filter Selection—System Design Method

Some gas imaging systems require a sensor with high sensitivity in the target band. As part of this system and method, not only is the filter selection optimized for signal to noise ratio, but it is optimized considering interfering (confuser) gasses. The proposed filter selection is thus done based on optimizing the signal to noise ratio and signal to background considering not only the gas spectra, but also the graybody emissions from possible earth or environment backgrounds and available sensor spectral response. These emissions increase noise and thus decrease detectability. Consider the case of methane, depending on the humidity of the day, emissions from water may interfere with the detection because the emission wavelengths of water (humidity) overlap with the gas of interest. The method computes the graybody spectral radiance of the thermal background using Planck's law. The proposed method then varies the spectral bandwidth and peak wavelength of the possible filters based on the gas to be detected. Background, methane, water spectral irradiance levels are integrated for the possible filters within the response of the detector to get a signal level for the methane, the water, the background and the noise. The methane signal to water signal ratio (SCR) along with the methane signal to noise ratio (SNR) are computed. The best filter provides the best SCR and SNR numbers and is thus selected. For other gasses, possible clutter gasses are determined and computation is done in the same way.

Figure 7:
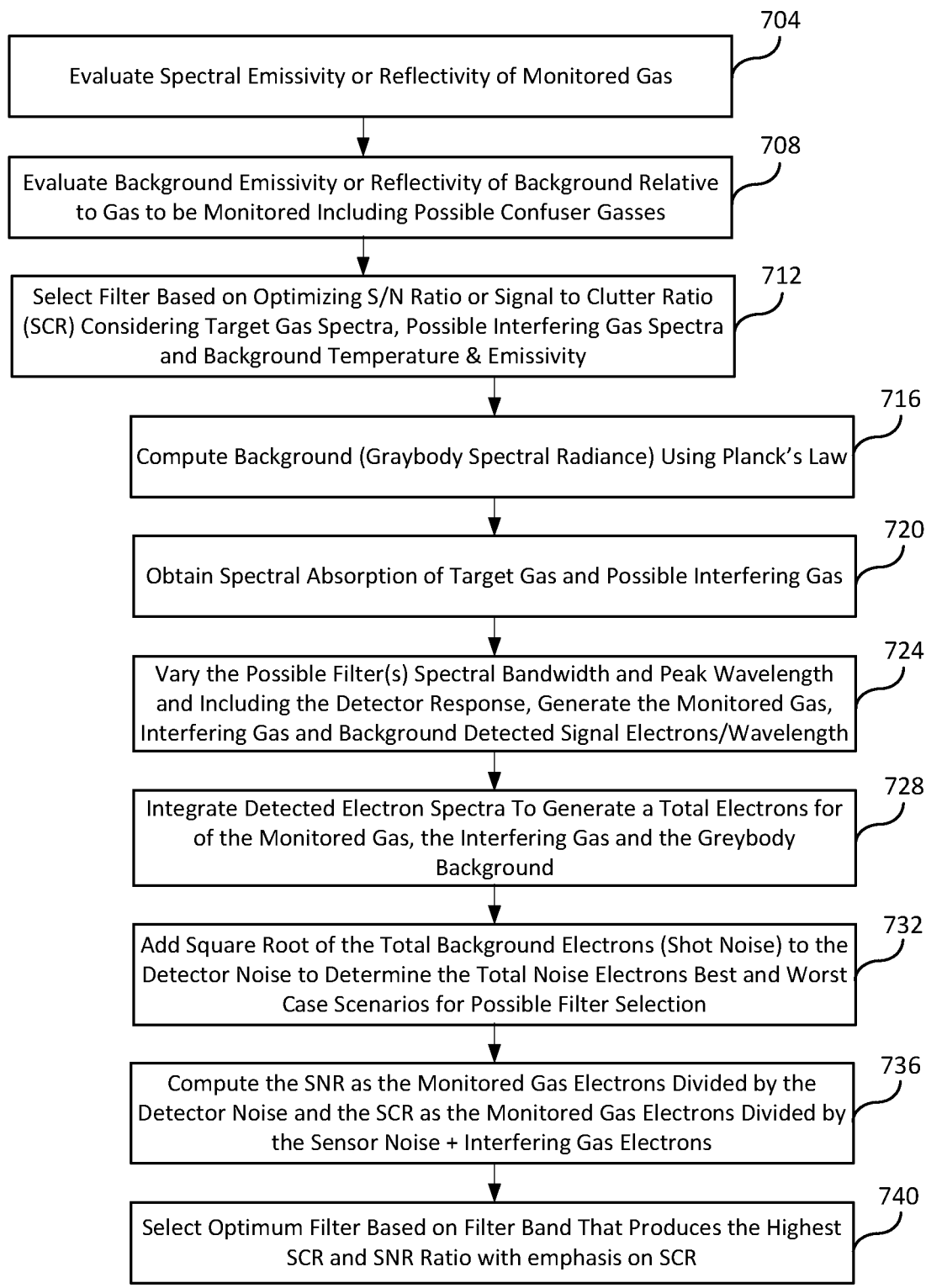
FIG. 7 illustrates an exemplary process for sensor and filter selection according to one embodiment.

FIG. 7 illustrates an exemplary process for detector and filter selection according to one embodiment. This is but one possible process for detector and filter selection. At the early stages, such as at step 704 an evaluation occurs of the spectral emissivity or reflectivity of the gas to be monitored. Different gasses will have different spectral emissivity and reflectively and this has to be taken into consideration. Next, at a step 708, this process evaluates background emissivity and/or reflectivity of the background relative to gas to be monitored including all possible confuser gasses. A confuser gas is a gas with emission or reflection in the same wavelength region as the target gas. Step 708 takes into account the background environment, from the standpoint of emissivity and reflectivity. The differences between the gas's spectral emissivity or reflectively and the background are used to isolate turbulence of the gas.

Next, at a step 712, a filter is selected based on optimizing the S/N Ratio (SNR) or signal to clutter ratio (SCR) considering the target gas spectra and any possible interfering gas spectra and background temperature & emissivity. Additional detail is provided starting at step 716. At a step 716, the process computes background (graybody spectral radiance) using Planck's law. Then, at a step 720, this process obtains spectral absorption of the target gas and possible interfering gas. Gas spectra are available in databases such as Hitran or SpectraPlot.com.

At a step 724 this process varies the possible filter(s) spectral bandwidth and peak wavelength and includes the detector response, while generating the monitored gas, interfering gas and background detected signal electrons/wavelength. At a step 728 of the system design process, the designer integrates the detected electron spectra over the filter and detector response curves to generate the total electrons for the monitored gas, the interfering gas and the graybody background as seen by the possible system. Based on this calculation, at a step 732 the process adds the square root of the total background electrons (shot noise) to the detector noise to determine the total noise electrons for best and worst case scenarios for possible filter selection.

Next, at a step 736, the SNR is computed as the monitored gas electrons divided by the detector noise and the SCR as the monitored gas electrons divided by the detector noise plus the interfering gas electrons. Based on these calculations, at a step 740, the system designer selects one or more optimum filter(s) based on filter band that produces the highest SNR and/or SCR depending on the scenario. This is then part of the system optimized for the user. This is but one possible process for detector and filter selection and other methods or processes are possible which do not depart from the claims that follow.

Turbulence Enhancement and Object Creation

In the embodiment disclosed herein, the gas flow is assumed to be a turbulent flow. In turbulence theory, the refractive index structure function is directly related to the strength of turbulence and is proportional to the variance of over space (or time, via Kolmogorov scales). It is assumed that the turbulence is isotropic (i.e., equivalent in all directions). That means that if the frames of the video stream (time) are considered as the third dimension and the variance of each pixel is taken or measured over some fixed period of time (a frame stack), turbulent eddies should be enhanced in the other two dimensions and stationary objects will be removed from the image. Atmospheric turbulence in the visible wavelengths can be visualized using this method. An imager (detector) with a targeted spectral band will show a much stronger signal with this method for a targeted gas than current visualization methods that are not based on the physics associated with turbulent flows.

The variance image described in the invention "Passive method to measure the strength of turbulence" (U.S. patent application Ser. No. 15/201,306, allowed on May 6, 2019), increases the contrast of the gas and minimizes the contrast for stationary objects. Given an intensity measurement imaged onto a focal plane at pixel location x, y, at time t, and based on proportionality to Kolmogorov's ansatz (Kolmogorov 1941), the received flux variance, $\sigma_z^2$ (x, y, t), is defined as the normalized variance over all pixels on the focal plane over n samples in $\Delta t$ increments as:

$$\sigma_Z^2(x, y, t) = \frac{\langle I(x, y, \tau)^2 \rangle_{\tau=t_0 \text{ to } t_0+n\Delta t} - \langle I(x, y, \tau) \rangle^2_{all\, x,y \& \tau}}{\langle I(x, y, \tau) \rangle^2_{all\, x,y \& \tau}}. \quad (1)$$

In this equation, the variables x, y, and t represent the x pixel location on the detector, the y pixel location on the detector, and the time of the frame. The variable I represents received intensity in counts. After the first frame stack, the system updates on a frame by frame basis.

Most IR detectors, particularly micro-bolometers have fixed pattern noise even after non-uniformity correction has been applied. In order to remove this, a one-dimensional spatial filter is applied. This one-dimensional filter computes the intensity for each pixel as:

$$I_{row}(c, r) = \frac{-I(c-k, r)}{2} + I(c, r) - \frac{I(c+k, r)}{2} \quad (2)$$

where k corresponds to a filter size (typically set to 3) and I corresponds to a pixel intensity in digital number (dn=counts from the imaging device), r is the row number, and c is the column number in the image. The filtered image is subtracted from its corresponding unfiltered image to remove this noise source.

From the variance image, any pixel that is above the desired SNR threshold (usually 4-6) is clustered using a nearest neighbor algorithm or any other clustering algorithm such as k-means. The clustered objects are then examined for flow patterns.

Figure 8:
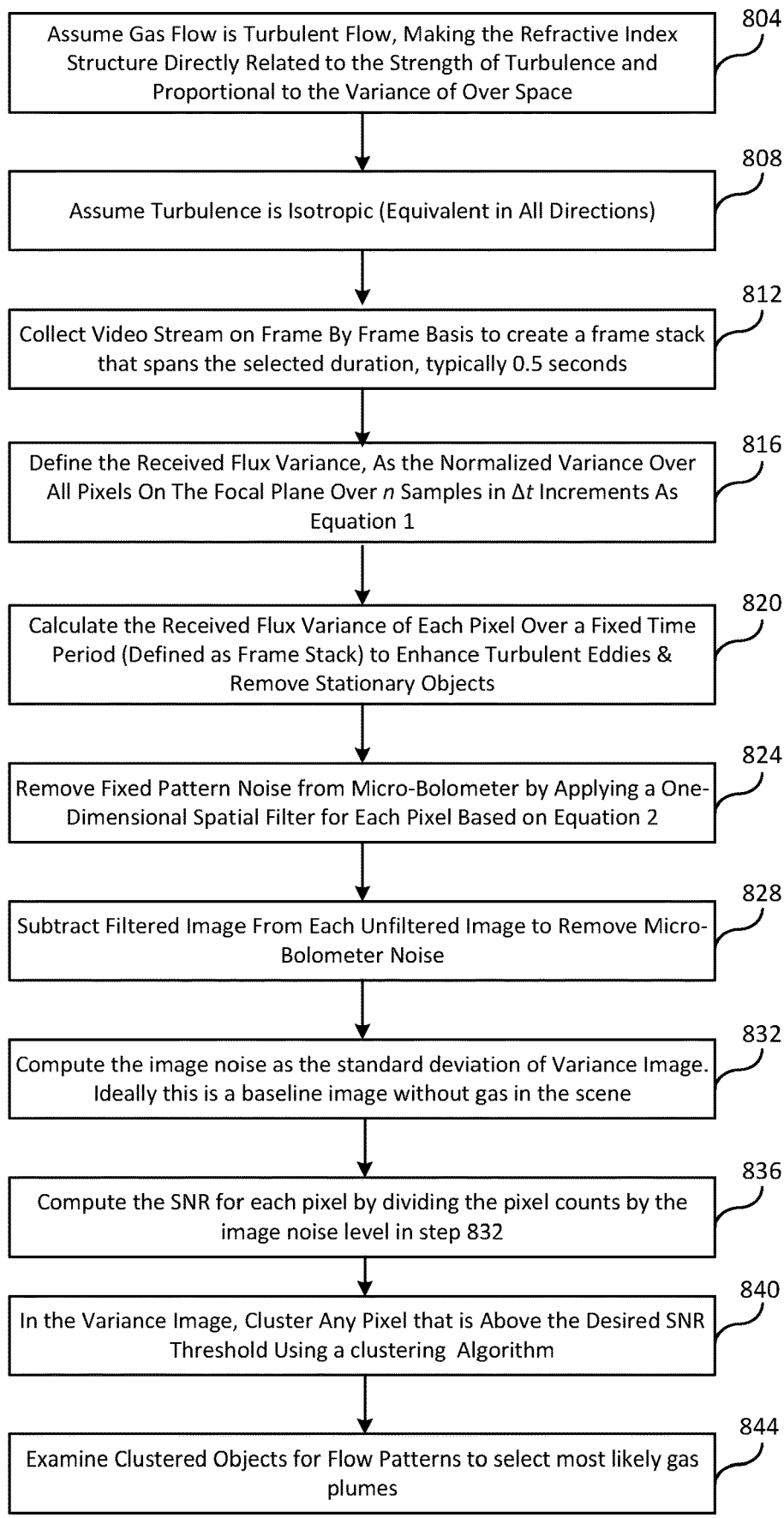
FIG. 8 illustrates an exemplary process for turbulence enhancement and object creation.

FIG. 8 illustrates an exemplary process for turbulence enhancement and object creation. In this example embodiment, at a step 804 it is assumed that the gas flow is a turbulent flow. For turbulent gasses (including air) the refractive index structure function is directly related to the strength of turbulence is proportional to the received flux variance (the square of the standard deviation) over the physical space occupied by the gas. Then, at a step 808 it is assumed that the turbulence is isotropic, which is to say it is equivalent in all directions. Based on these initial parameters, at a step 812 this method operation collects the video stream on a frame by frame basis to create a frame stack for the selected duration, typically 0.5 seconds.

Thereafter, at a step 816 the received flux variance image is defined as the normalized variance over all pixels on the focal plane over n samples in $\Delta t$ increments. This is shown as Equation 1 herein. At a step 820 the received flux variance of each pixel, over a fixed time period is calculated (defined as frame stack) to enhance turbulent eddies and remove stationary objects. Steps 824 and 828 are optional, and includes removal of fixed pattern noise from a detector such as a micro-bolometer by applying a one-dimensional spatial filter for each pixel based on Equation 2. In optional step 828, the fixed pattern noise in the filtered image is subtracted from the original image. The downside to not taking the action of steps 824 and 828 is that the detector fixed pattern noise may increase the background levels and reduce contrast making the system less sensitive to lower gas concentrations. The steps 824 and 828 are considered optional because the gas detection occurs without these steps, but these steps may improve accuracy and resolution.

Next, at a step 832, the system computes the image noise as the standard deviation of a baseline variance image. This may occur on a pixel by pixel basis, pixel blocks, or the entire image block. Ideally, this is a baseline image without gas in the scene. At step 836, the signal to noise ratio (SNR) for each pixel is computed by dividing the pixel intensity by the noise from step 832. At a step 840, in the variance image, this processing method clusters any pixel that is above the desired SNR threshold using a clustering algorithm such as k-means or nearest neighbor. At a step 844, the clustered objects are examined for flow patterns as described in FIG. 9.

Calculation of Flow Patterns

While the variance method enhances the contrast of gasses above backgrounds, moving objects will also be enhanced. Gasses have distinctly different flow patterns from a bird or person moving across the scene. As a result, flow patterns are computed via derivatives of intensity variations with respect to the image rows and columns. For each variance image the derivative image is computed to obtain a mean of the derivative of the intensity with respect to x (columns) and y (rows) for each block. The dI/dx and dI/dy for each pixel is thus computed as:

$$\frac{dI(c, r)}{dx} = I(c, r) - I(c - k_o, r) \quad (3)$$

$$\frac{dI(c, r)}{dy} = I(c, r) - I(c, r - k_o) \quad (4)$$

Where $k_o$ is the number of offset pixels chosen based on the detector. This may clip the images by $k_o$ pixels. The angle of the gas flow (flow direction) for each pixel is thus computed as:

$$\alpha(c, r) = \tan^{-1}\left(\frac{dI(c, r)}{dy} \Big/ \frac{dI(c, r)}{dx}\right) \quad (5)$$

The magnitude of the gas flow direction is computed as:

$$I_{flow} = \sqrt{\left(\frac{dI(c, r)}{dx}\right)^2 + \left(\frac{dI(c, r)}{dy}\right)^2} \quad (6)$$

A gas will have a strong flow direction depending on winds. Moving background objects in the variance image, in fact will not have a strong direction except at the edges of the detection. This means that the average flow direction of detected pixels can be used to remove false positives associated with moving objects. Using the average gas flow direction for the entire image as a threshold, detected objects with a flow direction typically ten times the average or over, are valid gas flows. In other embodiment, the threshold may be other than ten times the average.

Figure 9:
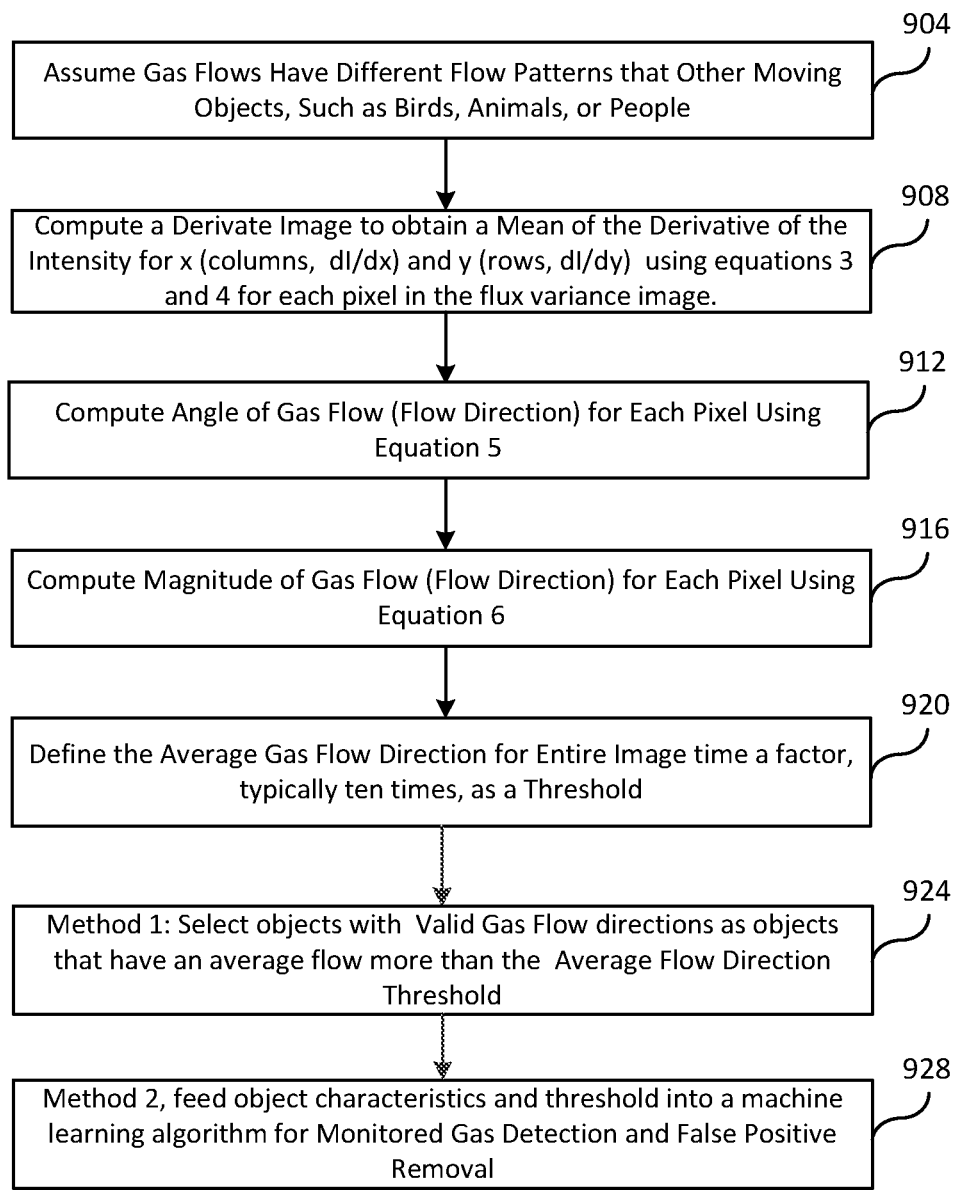
FIG. 9 illustrates an exemplary process for calculation of flow patterns and the rejection of non-gas like flows.

FIG. 9 illustrates an exemplary process for calculation of flow patterns and the rejection of non-gas like flows. This is but one possible process for flow pattern calculation and other methods or processes are possible which do not depart from the claims that follow. At a step 904, an assumption is made that the gas flows have different flow patterns than other moving objects, such as birds, animals, or people. As can be appreciated, a bird or animal, moves in a different pattern and manner. Digital signal processing can be used to detect this type of non-gas flow movement. It is also contemplated that machine learning can be used over time to teach the detection system. At a step 908, system initiates computation of flow patterns via spatial derivatives of the pixels in the variance image, in other words, motion variations with respect to the image rows and columns. The intensity variations indicate movement or gas flow and the process occurs across the rows and columns of pixels that form the flux variance image. In this step, for each variance Image, the system computes a derivate image to obtain a mean of the derivative of the intensity for x (columns) and y (rows) on a pixel by pixel basis. This is shown mathematically in Equations 3 and 4. Then, at a step 912 the system computes an angle of gas flow (which may be referred to as a flow direction) for each pixel using Equation 5. The flow direction is now known, and next the magnitude of the gas flow is calculated at a step 916. The magnitude of gas flow (flow direction) is calculated for each pixel using Equation 6.

At step 920, the average gas flow direction for the entire image is defined as a threshold such that valid gas flows are the detected objects with a flow direction that is typically ten times or more the average flow direction threshold.

There are two methods or processing options which may occur next. A first processing option or method is shown at a step 924 in which processing occurs to remove false object movement based on average flow direction of the detected pixels. The false object movement may be animals or movement, reflected in pixel changes, which are not gas flows. Animal movement may be fast and in a linear direction, such as for birds, or have defined edges and be direct movement with defined movement and stationary non-movement. Gas flows do not behave in this manner. In other embodiments other threshold multiplier may be used besides ten times the average flow direction. By adjusting this value, the system may be made more or less sensitive to gas flow detection. A more sensitive system may result in some false positive, but will detect smaller or less noticeable gas flows. Under a second method or processing option, shown at a step 928, the objects and full image characteristics are provided to a machine learning algorithm for monitored gas detection and false positive removal. The machine learning algorithm requires a training set to accurately identify naturally occurring movement and unwanted gas flows from leaks or releases.

Alarm & Display

Similar to home surveillance systems, this system can send an alarm for probable leak detections. This alarm can include an alert image giving context to the alarm and allowing the user to do a direct investigation of the potential leak. The context image can be IR or an overlay of a heat map on a visible image. A portable version of this system compatible with cell phones can allow more pointed investigation of the leak areas detected by the 24/7 system.

Figure 10:
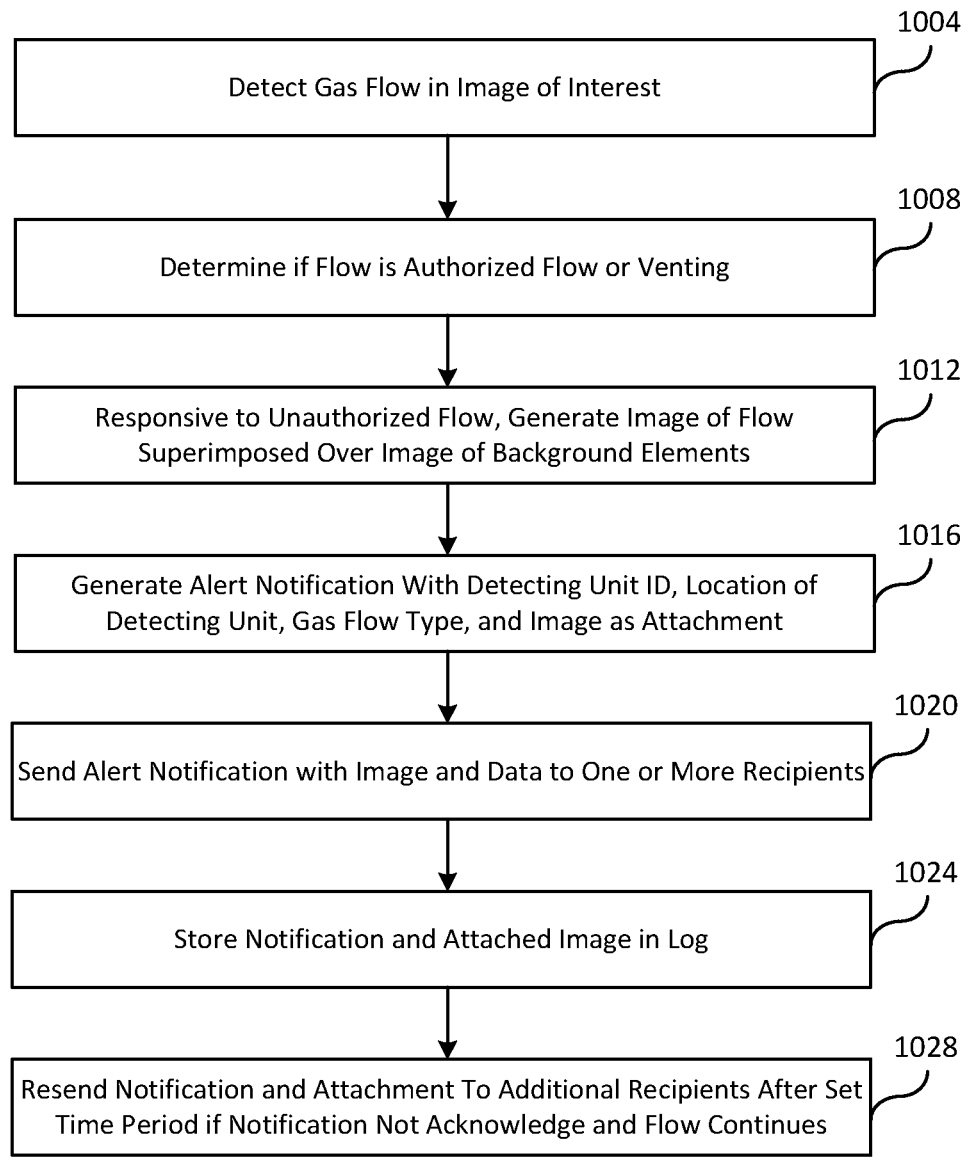
FIG. 10 illustrates an exemplary process for presenting and displaying notification or an alarm of a detected gas flow.

FIG. 10 illustrates an exemplary process for presenting and displaying notification or an alarm of a detected gas flow. This is but one possible process for flow pattern calculation and other methods or processes are possible which do not depart from the claims that follow. As discussed above and using the methods outlined herein, at a step 1004 the detection system detects a gas flow in the image of interest. Then, at a step 1008 a determination is made whether the flow is an authorized flow or authorized and expected venting. Some gas flows may be expected as part of testing, maintenance, or normal operation.

At a step 1012, responsive to detection of an unauthorized gas flow, the system generates an image of the detected flow superimposed over a context image. The context may be an image of the background, or an image with some background but also additional information that will help identify the location and severity of the gas flow. For example, measurements or distances may be imposed on the context image or color coded information to identify the location.

Next, at a step 1016 the system generates and alert notification with the gas flow detecting system ID number, location of the detecting unit, gas flow type, and image as attachment. Additional details may include information such as the toxicity of the gas, date and time, estimated flow rate, or any other information. At a step 1020, the system sends an alert notification with an image and associated data to one or more recipients. It is contemplated that the alert may be sent via text message, email, telephone, in network communication, or any other means of communication. At a step 1024, the system stores the notification and the attached image in an alert log. Because the gas leak maybe a health and safety issue or an environmental danger, at a step 2018 the alert may be resent notification with attachment to additional recipients after a set time period if the previously sent (original) notification was not acknowledged and the flow continues. Due to the real time and automated leak monitoring and detection, the flow is continually monitored and is tracked until fixed. The additional notifications may be sent to additional people in the company or organization, or to governmental authorities.

Described is but one possible embodiment. Other embodiments are contemplated based on the disclosure and would be understood by one of ordinary skill in the art. The attached figures are taken from related patent application further support the disclosed innovation providing hardware elements that may be used to provide functionality.

What is claimed is:

1. A system for monitoring for a gas leak from a gas containing structure comprising:
    a lens configured to receive an image of a scene of interest, the scene of interest containing a gas containing structure containing a gas being monitored;
    a filter located after the lens, the filter having one or more passbands that pass wavelengths which match one or more emission or reflectively wavelengths of the gas being monitored;
    a detector arranged to receive the image after the image passes through the lens and the filter, the detector configured to generate image data representing the scene including gas containing structure;
    a processor configured to process the image data by executing machine executable code;
    a memory configured to store non-transitory machine executable code, the machine executable code configured to:

process the image data to identify turbulence flow in the scene represented by the image data such that turbulence flow indicates a gas leak, which includes:
  calculating the flux variance of a frame stack to enhance turbulence to create variance image;
  using a clustering algorithm to cluster pixels represented by the image data that are above a signal to noise threshold and analyze cluster objects for flow patterns indicating gas flow; and
  for variance images:
    computing a derivate image to obtain spatial derivative of a flux variance for column and rows of pixel blocks;
    computing an angle of gas flow for pixels;
    computing the magnitude of gas flow for pixels; and
    removing false object movement based on average flow direction;
  generate and send an alert in response to the identification of a turbulence flow.

2. The system of claim 1 wherein the gas containing structure is selected from the following group of gas containing structures: pipe, pipeline, tank, barrel, hose, tanker, container, or any structure that contains a gas needing to be monitored.

3. The system of claim 1 wherein process the image data comprises superimposing the identified turbulence flow on a context image to create an alert image and sending the alert image with the alert.

4. The system of claim 1 further comprising a communication module configured with a wired or wireless transceiver, the communication module configured to send the alert to provide notification of the gas leak.

5. A method for monitoring for a gas leak from a gas containment structure containing a gas comprising:
  providing a gas leak monitoring system that includes a lens, filter, and detector, which form a sensor, and also a processor, and a memory;
  directing the sensor at a scene to receive emitted or reflected image wavelengths from the scene, the scene comprising at least a portion of the gas containment structure and an area around the gas containment structure;
  filtering the scene with the filter located in the sensor, the filter having a passband that corresponds to an emission band or reflection band of the gas;
  capturing image data with the sensor, the image data representing the scene after filtering by the filter;
  processing the image data to identify turbulence based on variation in pixel values over time, which includes:
    calculating the flux variance of a frame stack to enhance turbulence to create variance image;
    using a clustering algorithm to cluster pixels represented by the image data that are above a signal to noise threshold and analyze cluster objects for flow patterns indicating gas flow; and
    for variance images:
    computing a derivate image to obtain spatial derivative of a flux variance for column and rows of pixel blocks;
    computing an angle of gas flow for pixels;
    computing the magnitude of gas flow for pixels; and
    removing false object movement based on average flow direction; and
  responsive to identification of turbulence, generate and send an alert indicating a gas leak.

6. The method of claim 5 further comprising providing a lens and adjusting the lens to control the portion of the gas containment structure and the area around the gas containment structure that is presented to the filter and detector.

7. The method of claim 5 wherein processing the image data further comprises removing or disregarding object movement unrelated to gas leaks from the image based on average flow direction of pixel data.

8. The method of claim 5 wherein sending an alert comprises sending an alert with an image of the gas leak overlaid on a context image.

9. A system for monitoring and detecting a release of a gas from a monitored area comprising:
  a lens;
  a filter, directed at the monitored area, having a passband that passes at least one emission wavelength or reflective wavelength of the gas, the filter generating a filtered image;
  an uncooled detector configured to receive and generate image data representing the filtered image;
  a communication module configured to communicate over a network;
  a processor configured to execute machine executable instructions;
  a memory configured to store machine executable instructions that:
    process the image data to identify and isolate turbulence generated by a release of the gas based on changes in pixel values over time, wherein processing the image data comprises:
      calculating the flux variance of a frame stack to enhance turbulence to create variance image;
      using a clustering algorithm to cluster pixels represented by the image data that are above a signal to noise threshold and analyze cluster objects for flow patterns indicating gas flow; and
      for variance images:
      computing a derivate image to obtain spatial derivative of a flux variance for column and rows of pixel blocks;
      computing an angle of gas flow for pixels;
      computing the magnitude of gas flow for pixels; and
      removing false object movement based on average flow direction;
    generate an alert configured to notify a person of the gas leak; and
    send the alert to the person.

10. The system of claim 9 wherein the lens is configured to focus the gas leaks in the scene image onto the detector.

11. The system of claim 9 further comprising an energy source configured to illuminate an area being monitored for release of a gas.

12. The system of claim 9 wherein the alert includes an image that shows the gas leak and the monitored area.

13. The system of claim 9 wherein the alert includes the type of gas which is leaking.

* * * * *